(12) United States Patent
Gonzalez

(10) Patent No.: US 7,334,803 B2
(45) Date of Patent: Feb. 26, 2008

(54) WHEELBARROW WITH RETRACTABLE CONFIGURATION

(76) Inventor: Jason Gonzalez, 9739 Mesa Springs Way, #150, San Diego, CA (US) 92126

( * ) Notice: Subject to any disclaimer, the term of this patent is extended or adjusted under 35 U.S.C. 154(b) by 0 days.

(21) Appl. No.: 11/455,057

(22) Filed: Jun. 19, 2006

(65) Prior Publication Data

US 2007/0290467 A1   Dec. 20, 2007

(51) Int. Cl.
*B62B 1/24* (2006.01)
(52) U.S. Cl. .............................. 280/47.31; 280/47.23; 280/78; 280/653; 280/47.26; 280/47.3; 280/47.17; 280/47.32
(58) Field of Classification Search ............ 280/47.31, 280/47.32, 78, 653, 47.26, 47.3, 47.17
See application file for complete search history.

(56) References Cited

U.S. PATENT DOCUMENTS

| 207,222 | A | | 8/1878 | Tennent |
| 354,775 | A | | 12/1886 | Fay |
| 1,544,769 | A | | 7/1925 | Nalder |
| 2,233,710 | A | | 3/1941 | Osterkamp |
| 2,544,505 | A | * | 3/1951 | Kronhaus ................... 414/554 |
| 3,021,625 | A | * | 2/1962 | Stasse ......................... 37/434 |
| 3,552,760 | A | | 1/1971 | Sine |
| 3,722,904 | A | | 3/1973 | Puckett |
| 4,299,340 | A | * | 11/1981 | Hrytzak ................. 222/189.07 |
| 5,121,970 | A | * | 6/1992 | Andersen ....................... 298/3 |
| 5,839,772 | A | * | 11/1998 | Toole ........................... 296/32 |
| 6,209,595 | B1 | * | 4/2001 | Granath ...................... 141/340 |
| 6,213,482 | B1 | * | 4/2001 | Yemini .................... 280/47.26 |
| 6,213,532 | B1 | * | 4/2001 | Dunyon ....................... 296/32 |
| 6,390,496 | B1 | * | 5/2002 | Eicher ......................... 280/653 |
| 6,886,838 | B1 | | 5/2005 | Zimmerman |
| 6,908,089 | B1 | * | 6/2005 | Stark et al. .............. 280/47.31 |
| 2004/0061372 | A1 | * | 4/2004 | Messinger-Rapport ......... 298/3 |

* cited by examiner

*Primary Examiner*—Christopher P. Ellis
*Assistant Examiner*—Cynthia F. Collado
(74) *Attorney, Agent, or Firm*—John Karl Buche

(57) ABSTRACT

An improved wheelbarrow featuring a retractable configuration that permits ready emptying of a wheelbarrow receptacle, with reduced need to tilt, lift or invert the wheelbarrow. A wheelbarrow is disclosed with a retractable configuration that is optionally operable by the user to create an egress for wheelbarrow cargo.

17 Claims, 4 Drawing Sheets

WHEELBARROW WITH RETRACTABLE CONFIGURATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present invention relates to the field of wheelbarrows.

2. Background of the Invention

Wheelbarrows have been used for centuries, with the basic principles of leverage and the wheel converging to assist with transport of heavy items over ground. Although there are written descriptions of wheelbarrows dating to the first century B.C., the oldest surviving picture, a frieze relief from a tomb-shrine in Szechuan province of China, dates from about 118 A.D. Other sources recite that the first wheelbarrows were purportedly developed by Chuko Liang (181-234 A.D.) of China, a general who used the wheelbarrows to transport supplies to injured soldiers. (http://inventors.about.com/library/inventors/blwheelbarrow.htm). These first wheelbarrows had two wheels and required two men to propel and steer. Wheelbarrows are not believed to have arrived in Europe before the eleventh or twelfth century, with the earliest known Western depiction in a window at Cartres Cathedral dated around 1220 A.D. http://inventors.about.com/gi/dynamic/offsite.htm?site=http://library.thinkquest.org/23062/wbarrow.html). Since the arrival of the wheelbarrow centuries ago, many improvements have been fashioned to ease the workload on the user, with a variety of improvements documented in the United States patent office. Notable improvements include U.S. Pat. No. 207,222 to Tennent (1878) (barrow formed of a continuous wood construction); U.S. Pat. No. 354,775 to Fay (1886) (a leg brace for barrow cargo); U.S. Pat. No. 2,233,710 to Osterkamp (1941) (wheelbarrow with a forward pouring spout); U.S. Pat. No. 1,544,769 to Nalder (1925) (wheelbarrow with a forward tilting load receptacle); U.S. Pat. No. 3,552,760 to Sine (1971) (wheelbarrow with folding and collapsible sides); U.S. Pat. No. 3,722,904 to Puckett (1973) (folding wheelbarrow for compact storage); U.S. Pat. No. 5,121,970 to Andersen (1992) (apparatus for retrofit to an existing wheelbarrow that allows additional pivoted travel of receptacle while dumping cargo); U.S. Pat. No. 6,886,838 to Zimmerman (2005) (wheelbarrow handle featuring a pivoting action that tilts forward the barrow receptacle when handles are pushed down); and U.S. Pat. No. 6,908,089 to Stark (2005) (wheelbarrow featuring a semi-enclosed pouring chute attachment). While each of the foregoing inventions are noble improvements to the wheelbarrow, they do not address in the same manner a present concern of this invention, which is to provide a further improvement to reduce the lifting and tilting required to empty a wheelbarrow.

SUMMARY OF THE INVENTION

Accordingly, it an objective of the present application to provide an improved wheelbarrow featuring a retractable configuration that permits ready emptying of a wheelbarrow receptacle, with a reduced need to tilt or invert the wheelbarrow.

It is a further object of the application to provide a wheelbarrow with a retractable configuration that is optionally operable by the user to create an egress for wheelbarrow cargo, which retracted state may not have been desirable during transport of cargo.

It is an object of the present invention to provide a wheelbarrow that is cost-effective to manufacture and of sturdy construction.

It is a further object of the present invention to provide a wheelbarrow that is easy to wash, without standing water disposed in the load receptacle.

Other objectives of the invention will become apparent to those skilled in the art once the invention has been shown and described.

BRIEF DESCRIPTION OF THE DRAWING

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
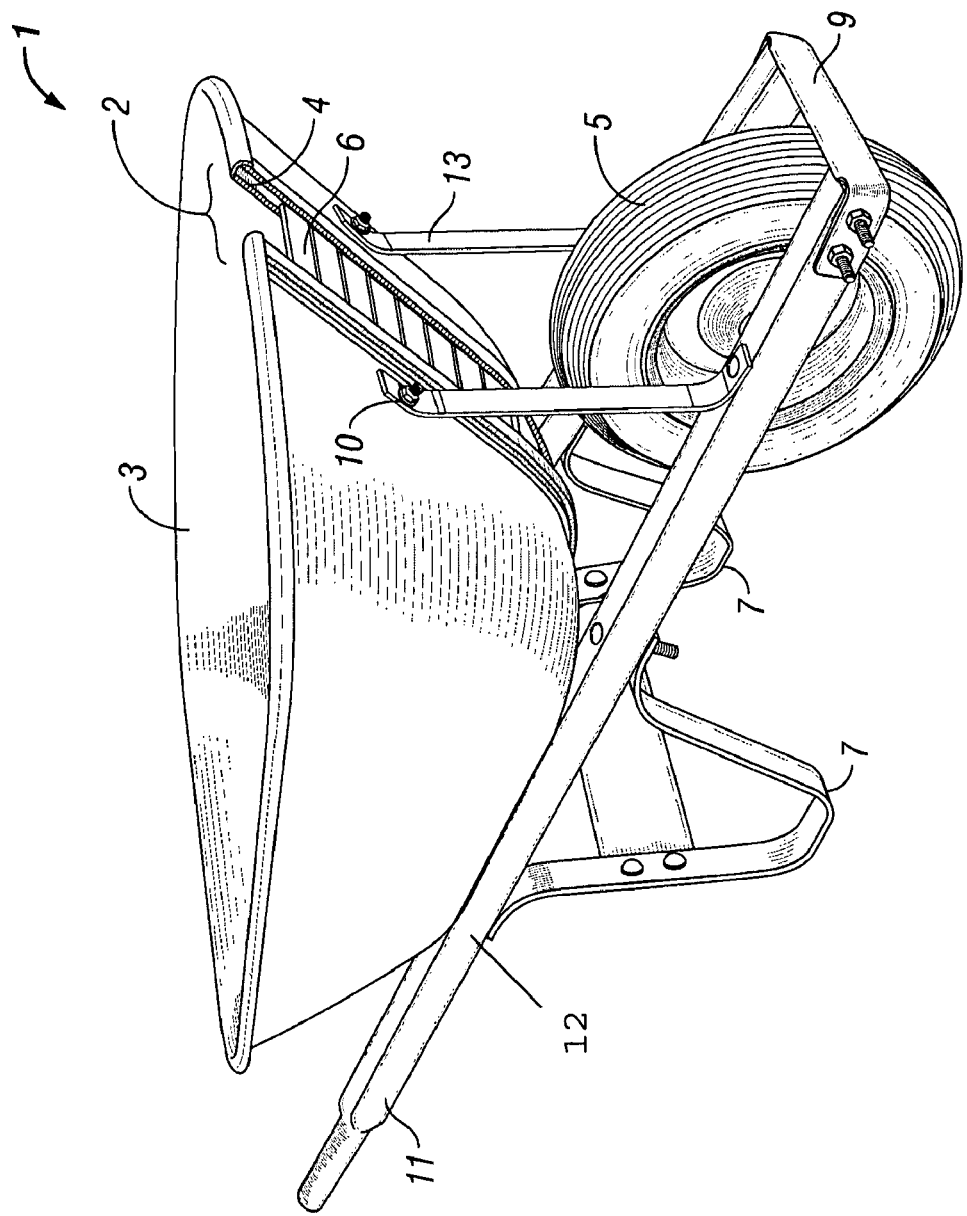
FIG. 1 is a perspective view of a wheelbarrow apparatus featuring a retractable configuration.

FIG. 1 is a perspective view of a wheelbarrow 1 featuring a preferable retractable configuration 2. The wheelbarrow 1 features certain components common to most wheelbarrows, namely, handle(s) 11, resting leg(s) 7, a wheel unit 5, and a load receptacle 3 supported by and appended to a wheelbarrow frame 12. The wheelbarrow frame 12 is used to describe portions of the wheelbarrow that support the load receptacle 3. This wheelbarrow frame 12 may preferably be defined by handles 11 (which may also support the load receptacle 3), resting leg(s) 7 or also by typical support structure(s) 13. FIG. 1 further depicts two handles 11 converging at a front end 11, with this front end 11 fixedly connecting lower points of said handles 11 so that they are framed around wheel unit 5 and support an axle extending therethrough. The wheel unit 5 shown is one typical of existing wheelbarrows, with a tire (pneumatic or solid), hub and aperture to receive an axle. In FIG. 1, the axle attaches to inside surfaces of the handles 11. Resting legs 7 are typically fashioned in the form of skid plates, although other forms of resting legs 7 are known in the wheelbarrow art. FIG. 1 also depicts a support structure 13 holding load receptacle 3 by fastening means 10, such is additional to the support offered by handles 7, and to which the load receptacle 3 is also typically affixed. All wheelbarrows feature some variety of load receptacle 3 or "tray" as sometimes referred to in the industry. Load receptacles 3 are formed from a variety of preferable materials, including but not limited to woods, metals, alloys, composites, and a variety of hard plastics. Load receptacles 3 also vary in shape, although a common shape is shown in FIG. 1 with more rounded features. Load receptacles 3 are commonly also made of rectangular or squared shapes, with one or more distinct and sharply intersecting surfaces.

Most importantly, FIG. 1 demonstrates a wheelbarrow 1 with a retractable configuration 2. This retractable configuration 2 defines a modification to a wheelbarrow load receptacle 3 so that the load receptacle 3 may be optionally transformed from a device that holds and transports cargo into a shape that facilitates rapid removal of cargo, with no or comparatively lesser lifting and tilting needed to empty the cargo. Emptying a common wheelbarrow can be a strenuous and an awkward activity, particularly where cargo gets trapped in the lower portions of the load receptacle 3. It is typically necessary to lift the rearmost portion of the wheelbarrow up, or sometimes lift it up and turn the wheelbarrow vertical or to the side to effect emptying the contents. Heavier cargo can exacerbate an already difficult activity and cause injury or strain to a user. Therefore, the retractable configuration 2 operates effectively to lower the exit location for cargo on wheelbarrow 1. Retractable configuration 2 features a means to selectively lower at least one surface of the load receptacle 3. Such retractable configuration 2 operates by a means in the form of a preferable retractable member 6 that is lowered, exposing and defining an opening in load receptacle 3 as it is opened. Retractable configuration 2 is preferably operably configured at a forward position of load receptacle 3, and is further preferably centrally configured along load receptacle 3. FIG. 1 depicts such preferable means, and an embodiment wherein retractable member 6 is formed from a movable track. FIG. 1 further depicts how such a retractable member 6 is operably configured to movably interconnect with member guide 4 disposed in the load receptacle 3. As shown in FIG. 1, retractable member 6 may be lowered, allowing easy removal of cargo from the wheelbarrow 1. Retractable member 6 is preferably formed in the track formation as this allows the member to make its way up and down a member guide 4, and assume the shape and contours of load receptacle 3 to which it is movably coupled. Retractable member 6 may be formed from metals, alloys, wood, composites, and hard plastics, including but not limited to PVC, polyethylene, polypropylene, or any other plastic or composite that may assume a rigid shape. Segments forming a preferable track of retractable member 6 may also be joined by more flexible plastics, rubber, rubber synthetics, weaves, or composite fibers that join the respective track segments. Retractable member 6 may also be of uniform construction, rather than a track, for instance, when formed as a flexible plastic sheet member. In another preferable embodiment, retractable member 6 may feature wheels, bearings, tracks, or rolling means to assist with glide factor and retractability. Alternately, wheels, bearings, tracks, or rolling means may be fashioned along member guide 4 to similarly assist with glide factor and retractability. The inventor also discloses that member guide 4 or corresponding retractable member 6 may be fitted with brushes, rubber, silicone, or plastic shields along their lengths to facilitate waterproofing, avoiding debris obstructions, or corrosion.

Figure 2:
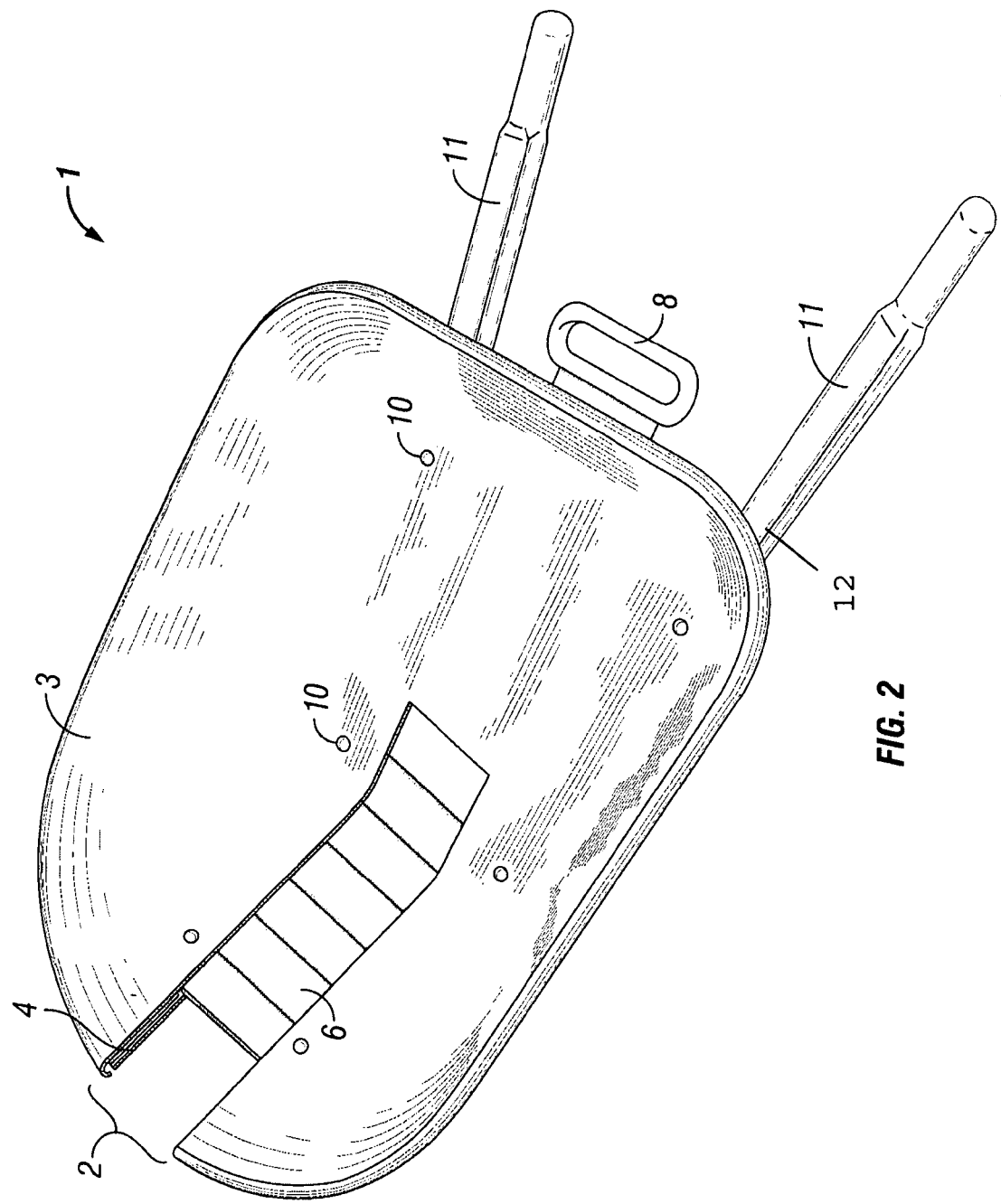
FIG. 2 is a top perspective view of the wheelbarrow with a preferable retractable configuration.

FIG. 2 is a top perspective view of the wheelbarrow 1. The drawing shows handles 11, load receptacle 3 (as connected by typical fastening means 10 (which are preferably but not limited to pins, bolts, screws, or similar devices), and a preferable embodiment of retractable configuration 2. In FIG. 2, the retractable member 6 is centrally disposed within and along the length of receptacle 3. A retractable member handle 8 is shown between wheelbarrow handles 11 and toward the rear of the wheelbarrow 1. This retractable member handle 8 is a preferable means of causing retractable member 6 to lower and it is fixedly connected to the base of retractable member 6. As retractable member handle 8 is pulled out, connected retractable member 6 descends, opening up the load receptacle for easy removal of cargo. Cargo that previously would have required tilting or turning over of the wheelbarrow 1 to empty can now be directed to the open space left in load receptacle 3 after retractable member 6 is withdrawn. Of course, to close the wheelbarrow 1, one need only push forward retractable member handle 8, which causes a corresponding closure of the load receptacle 3 as retractable configuration 2 is closed. FIG. 2 shows a manual version of moving retractable member 6, although the inventor also discloses a preferable mechanized embodiment that opens and shuts by use of a motor and corresponding switch that permit the user to move the retractable member 6 forward or backward as desired. Also, whereas in FIG. 2, retractable member 6 is manually pulled out of the backside of wheelbarrow 1 by means of a retractable member handle 8, in another embodiment of the present invention, retractable member 6 may be retracted by directing the retractable member 6 upward (manually or mechanized) within an internal space of load receptacle 3 occurring in the rear portion of the load receptacle 3 of wheelbarrow 1. Thus, the same opening action is accomplished, but the retractable member 6 remains confined within load receptacle 3. The retractable configuration 2 preferably operates by creating an opening by descending retractable member 6 in the range of 3 to 24 inches, or alternately with sufficient distance so that an opening is formed in load receptacle 3 at a point equal to the height of a bottom surface of the load receptacle 3. Retractable member 6 is preferably of a width in the range of 3 to 24 inches, although wider retractable member 6 units may be used.

Figure 3:
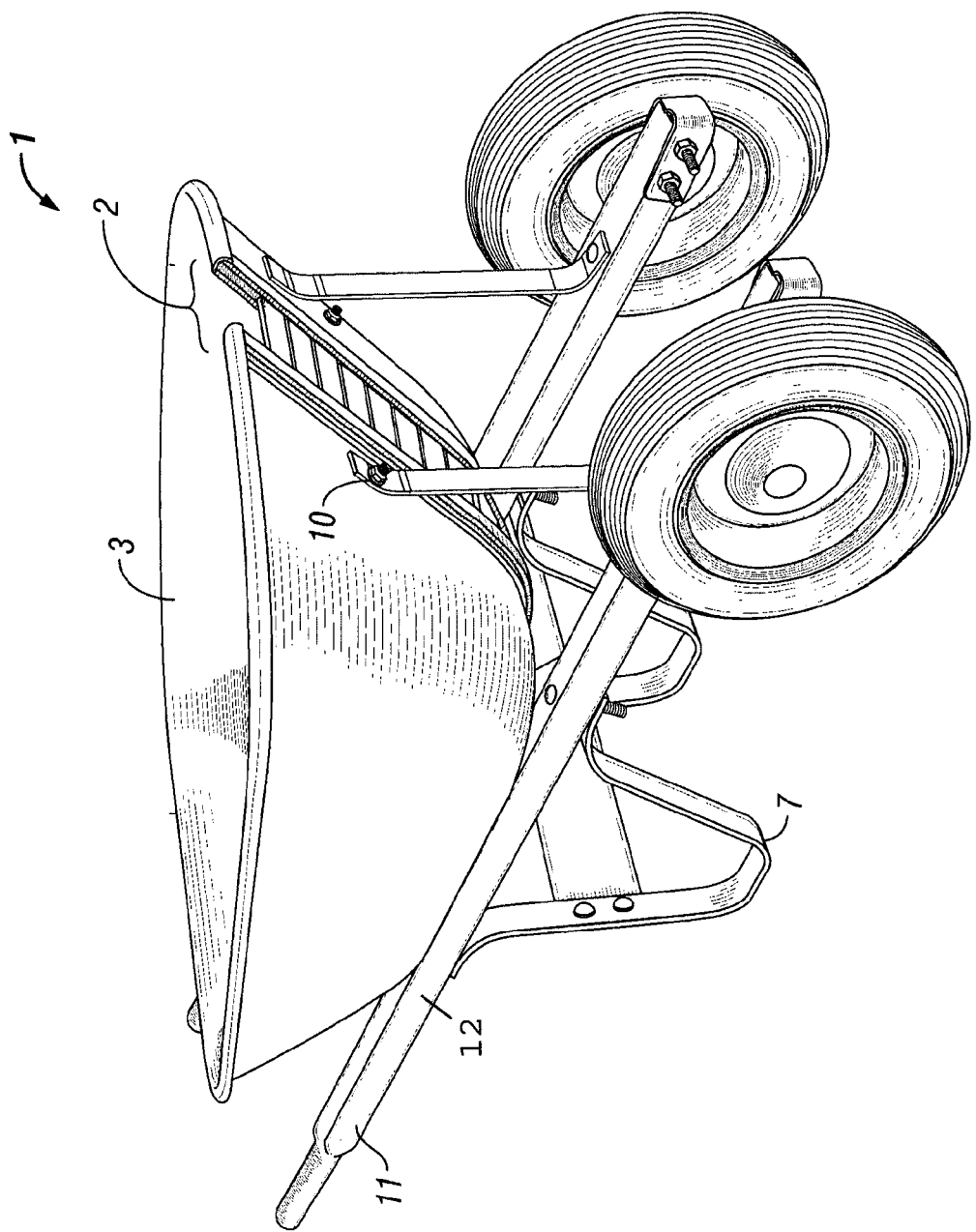
FIG. 3 is a top perspective of a two-wheeled embodiment of the invention.

FIG. 3 is a perspective view of yet another embodiment of the present invention featuring a plurality of wheel units 5. In this embodiment, the disposition of the wheel units 5 allows for a relatively unobstructed pathway for emptying of the contents of the barrow. The retractable configuration 2 has all the preferable benefits, features and optional modes of operation as previously described herein, however, with the additional benefit of a clear pathway of debris that will empty between the wheels. The preferable distance between wheels is at least as wide as retractable unit 2.

Figure 4:
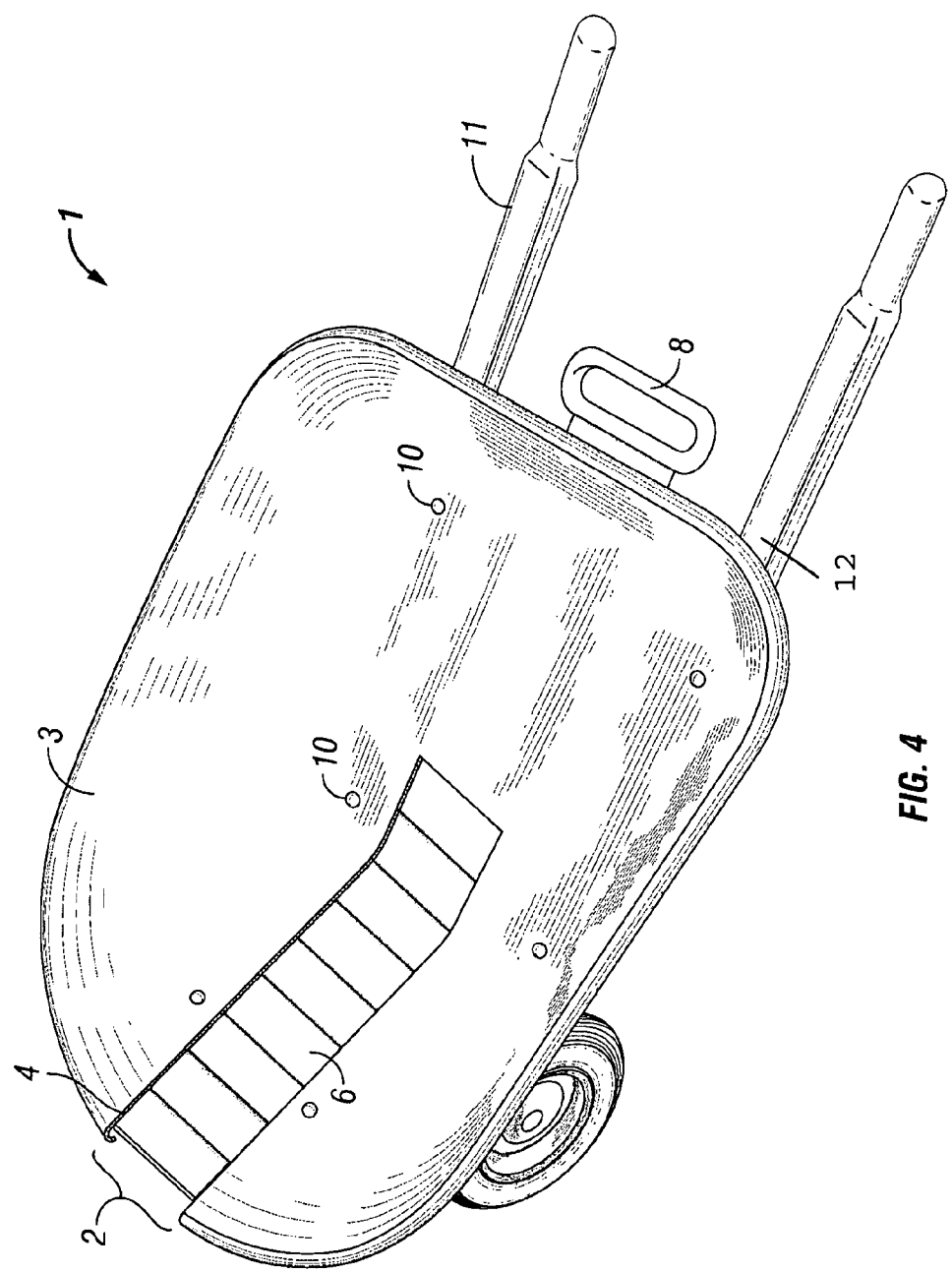
FIG. 4 is a top perspective of a two-wheeled embodiment of the invention.

FIG. 4 is a top perspective view of the wheelbarrow unit 1 shown in FIG. 3. As with the one-wheeled embodiment of the invention, retractable configuration 2 permits descending of retractable member 6. Retractable member 6 is preferably formed in a track formation as this allows the member to make its way up and down a member guide 4, and assume the shape and contours of load receptacle 3 to which it is movably coupled.

Disclosed is a wheelbarrow comprising a wheelbarrow frame, at least one wheel unit secured to said wheelbarrow frame, a load receptacle securely fixed to said wheelbarrow frame, and, a retractable configuration operably configured within said load receptacle. Further disclosed is a wheelbarrow wherein said retractable configuration further comprises means to selectively lower at least one surface of said load receptacle. Further disclosed is a wheelbarrow wherein said retractable configuration further comprises a retractable member. Further disclosed is a wheelbarrow wherein said retractable configuration further comprises a retractable member that is a movable track. Further disclosed is a wheelbarrow wherein said retractable configuration further comprises a retractable member that is a movable track operably configured to movably interconnect with a member guide disposed in the load receptacle. Further disclosed is a wheelbarrow wherein said retractable configuration further comprises a retractable member that assumes the shape and contours of said load receptacle to which it is movably coupled. Further disclosed is a wheelbarrow further comprising a retractable configuration with a retractable member formed from any of the group of materials consisting essentially of metals, alloys, wood, composites, PVC, polyethylene, polypropylene, or plastics that assume a rigid shape. Further disclosed is a wheelbarrow wherein said retractable configuration further comprises a retractable member that features segments joined to form a track. Disclosed is a wheelbarrow comprising a wheelbarrow frame; at least one wheel unit secured to said wheelbarrow frame; a load receptacle securely fixed to said wheelbarrow frame; and, wherein said load receptacle features at least one retractable member that may be lowered to reveal an opening in said load receptacle. Further disclosed is a wheelbarrow comprising: a wheelbarrow frame; at least two wheel units secured to said wheelbarrow frame; a load receptacle securely fixed to said wheelbarrow frame; and, a retractable configuration operably configured within said load receptacle.

The appended drawings illustrate only typical embodiments of this invention and are therefore not to be considered limiting of its scope, for the invention may admit to other equally effective embodiments which are appreciated by those skillful in the arts.

I claim:

1. A wheelbarrow comprising:
   a wheelbarrow frame;
   at least one wheel unit secured to said wheelbarrow frame;
   a load receptacle securely fixed to said wheelbarrow frame;
   a retractable configuration featuring at least one retractable member, wherein said retractable configuration is operably configured within said load receptacle, and wherein said retractable member is a movable track; and,
   a means for controlling said retractable member.

2. The wheelbarrow of claim 1, wherein said retractable configuration further comprises means to selectively lower at least one surface of said load receptacle.

3. The wheelbarrow of claim 1, wherein said retractable member is integral with the front of said load receptacle.

4. The wheelbarrow of claim 1, wherein said retractable member may be lowered to reveal an opening in said load receptacle.

5. The wheelbarrow of claim 1, wherein said retractable member is operably configured to movably interconnect with a member guide disposed in the load receptacle.

6. The wheelbarrow of claim 1, wherein said retractable member assumes the shape and contours of said load receptacle to which it is movably coupled.

7. The wheelbarrow of claim 1, wherein said retractable member is formed from any of the group of materials consisting essentially of metals, alloys, wood, composites, PVC, polyethylene, polypropylene, or plastics that assume a rigid shape.

8. The wheelbarrow of claim 1, wherein said retractable member is defined by segments.

9. A wheelbarrow comprising:
   a wheelbarrow frame;
   at least one wheel unit secured to said wheelbarrow frame;
   a load receptacle securely fixed to said wheelbarrow frame;
   wherein said load receptacle features at least one retractable member that is a movable track, operably configured to movably interconnect with a member guide disposed in the load receptacle; and,
   a means for controlling said retractable member.

10. A wheelbarrow comprising:
    a wheelbarrow frame;
    at least two wheel units secured to said wheelbarrow frame;
    a load receptacle securely fixed to said wheelbarrow frame; and,
    a retractable configuration featuring at least one retractable member, wherein said retractable configuration is operably configured within said load receptacle, and wherein said retractable member is a movable track; and,
    a means for controlling said retractable member.

11. The wheelbarrow of claim 10, wherein said retractable configuration further comprises means to selectively lower at least one surface of said load receptacle.

12. The wheelbarrow of claim 10, wherein said retractable member is integral with the front of said load receptacle.

13. The wheelbarrow of claim 10, wherein said retractable member may be lowered to reveal an opening in said load receptacle.

14. The wheelbarrow of claim 10, wherein said retractable member is operably configured to movably interconnect with a member guide disposed in the load receptacle.

15. The wheelbarrow of claim 10, wherein said retractable member assumes the shape and contours of said load receptacle to which it is movably coupled.

16. The wheelbarrow of claim 10, wherein said retractable member is formed from any of the group of materials consisting essentially of metals, alloys, wood, composites, PVC, polyethylene, polypropylene, or plastics that assume a rigid shape.

17. The wheelbarrow of claim 10, wherein said retractable member is defined by segments.

* * * * *